US012624803B2

(12) United States Patent
Aguiar et al.

(10) Patent No.: US 12,624,803 B2
(45) Date of Patent: May 12, 2026

(54) HANDLE ASSEMBLY FOR A PORTABLE PRESSURIZED GAS CYLINDER

(71) Applicant: AMTROL Licensing Inc., West Warwick, RI (US)

(72) Inventors: Carlos Aguiar, Oporto (PT); Filipe Pedrosa, Matosinhos (PT); Tiago Teixeira Rego de Oliveira, Oporto (PT)

(73) Assignee: AMTROL LICENSING INC., West Warwick, RI (US)

( * ) Notice: Subject to any disclaimer, the term of this patent is extended or adjusted under 35 U.S.C. 154(b) by 93 days.

(21) Appl. No.: 18/883,572

(22) Filed: Sep. 12, 2024

(65) Prior Publication Data

US 2025/0003556 A1 Jan. 2, 2025

Related U.S. Application Data

(63) Continuation of application No. 17/678,331, filed on Feb. 23, 2022, now Pat. No. 12,104,750.

(51) Int. Cl.
*F17C 13/08* (2006.01)

(52) U.S. Cl.
CPC .... *F17C 13/084* (2013.01); *F17C 2201/0109* (2013.01); *F17C 2201/058* (2013.01);
(Continued)

(58) Field of Classification Search
CPC ........ F17C 13/00; F17C 13/04; F17C 13/084; F17C 2201/0109; F17C 2201/058; F17C 2205/0165; F17C 2205/0323; F17C 2221/017; F17C 2221/033; F17C 2221/035
(Continued)

(56) References Cited

U.S. PATENT DOCUMENTS 3,368,302 A * 2/1968 Martino .................... B64B 1/62
222/402.1
3,791,403 A 2/1974 Folkerth
(Continued)

FOREIGN PATENT DOCUMENTS

RU 2617646 C2 4/2017
SU 669144 A1 6/1979
WO 2017072157 A1 5/2017

OTHER PUBLICATIONS

International Search Report and Written Opinion of the International Searching Authority; PCT/US2023/062693; mailed Jun. 9, 2023; 13 pages.

*Primary Examiner* — Luan K Bui
(74) *Attorney, Agent, or Firm* — Tucker Ellis LLP

(57) ABSTRACT

Provided is a handle assembly for a cylinder. The handle assembly includes a handle support configured to couple to a valve of the cylinder. The handle support includes a body having first and second ends circumferentially spaced from one another to define a gap and a longitudinal passage opening to a top and bottom of the body for receiving the valve, and first and second deflectable arms projecting from the body. The handle assembly also includes a handle rotatably coupled to the handle support. The handle including a top portion, first and second side portions, and an attachment member coupled to the first and second deflectable arms of the handle.

19 Claims, 19 Drawing Sheets

(52) U.S. Cl.
CPC ................. *F17C 2205/0165* (2013.01); *F17C 2205/0323* (2013.01); *F17C 2221/017* (2013.01); *F17C 2221/033* (2013.01); *F17C 2221/035* (2013.01)

(58) Field of Classification Search
USPC .............................................................. 222/3
See application file for complete search history.

(56) References Cited

U.S. PATENT DOCUMENTS

| | | | | | |
|---|---|---|---|---|---|
| 4,352,443 | A * | 10/1982 | Libit | B05B 11/1032 222/207 |
| 4,363,424 | A | 12/1982 | Holben | |
| 6,138,714 | A | 10/2000 | Kim | |
| 7,588,276 | B1 | 9/2009 | Bibow | |
| 2005/0001440 | A1* | 1/2005 | Hartwell | B65G 7/12 294/137 |
| 2006/0196545 | A1 | 9/2006 | Trettin et al. | |
| 2014/0290794 | A1* | 10/2014 | Gan | F04B 9/14 141/51 |
| 2024/0280225 | A1* | 8/2024 | Aguiar | F17C 1/00 |

* cited by examiner

HANDLE ASSEMBLY FOR A PORTABLE PRESSURIZED GAS CYLINDER

RELATED APPLICATIONS

This application is a continuation of U.S. patent application Ser. No. 17/678,331 filed Feb. 23, 2022, which is hereby incorporated herein by reference.

TECHNICAL FIELD

In general, the present invention relates to a portable pressurized gas cylinder, and in particular to a handle assembly for a portable pressurized gas cylinder.

BACKGROUND OF THE INVENTION

A pressure tank containing a pressurized gas, a shutoff valve, and a tilt valve can be used for filling balloons. The tank is used to store a gas under a pressure, and the tank, the shutoff valve, and the tilt valve are placed in fluid communication with one another. The gas passes from the tank, through the shut off valve, through the tilt valve, and into the balloon in an effort to establish pressure equilibrium.

The pressure tank and the shutoff valve can be of unitary construction. The shutoff valve generally provides a measure of safety that ensures that the pressurized gas inside the tank does not leak out unwantedly or is not dispensed inadvertently or accidentally. For example, the shutoff valve is typically closed to prevent the loss of gas when the device is being stored or transported or when the device is not being used to fill balloons.

The tilt valve is placed in fluid communication with the shutoff valve by threading the tilt valve onto a mating threaded outlet port of the shutoff valve, the shutoff valve and the tilt valve having corresponding male and female threads, respectively. To fill a balloon, a consumer opens the shutoff valve, slides the neck of the balloon over the end of the tilt valve and presses against the side of the tilt valve, opening the tilt valve, transferring a portion of the pressurized gas stored in the pressure tank into the balloon to expand the balloon.

SUMMARY OF THE INVENTION

In accordance with an embodiment of the present application, a handle assembly for a cylinder is provided. The handle assembly includes a handle support configured to couple to a valve of the cylinder, the handle support including a body having first and second ends circumferentially spaced from one another to define a gap and a longitudinal passage opening to a top and bottom of the body for receiving the valve, and first and second deflectable arms projecting from the body, and a handle rotatably coupled to the handle support, the handle including a top portion, first and second side portions, and an attachment member coupled to the first and second deflectable arms of the handle.

In accordance with another embodiment of the present application, a portable cylinder for filling a balloon is provided. The portable cylinder includes a tank having a valve port, a valve coupled to the valve port, the valve including a handle and an outlet port, a nozzle coupled to the outlet port, the nozzle configured to receive the balloon, and a handle assembly including a handle support coupled to the valve and a handle coupled to the handle support.

In accordance with still another embodiment of the present application, a handle assembly for a cylinder is provided. The handle assembly includes a handle support configured to couple to a valve of the cylinder, the handle support including a body having first and second ends circumferentially spaced from one another to define a gap and a longitudinal passage opening to a top and bottom of the body for receiving the valve, and first and second deflectable arms projecting from the body, each deflectable arm including an inner arm member and an outer arm member laterally spaced from one another, and each inner and outer arm member including a slot opening to a bottom of the handle support, and a handle rotatably coupled to the handle support, the handle including a grip area and an attachment member including a plurality of laterally spaced projections projecting radially outwardly from the attachment member and a spacer on each side of each of the plurality of projections, each spacer being received in one of the slots via a snap connection to couple the attachment member to the handle.

These and other objects of this application will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
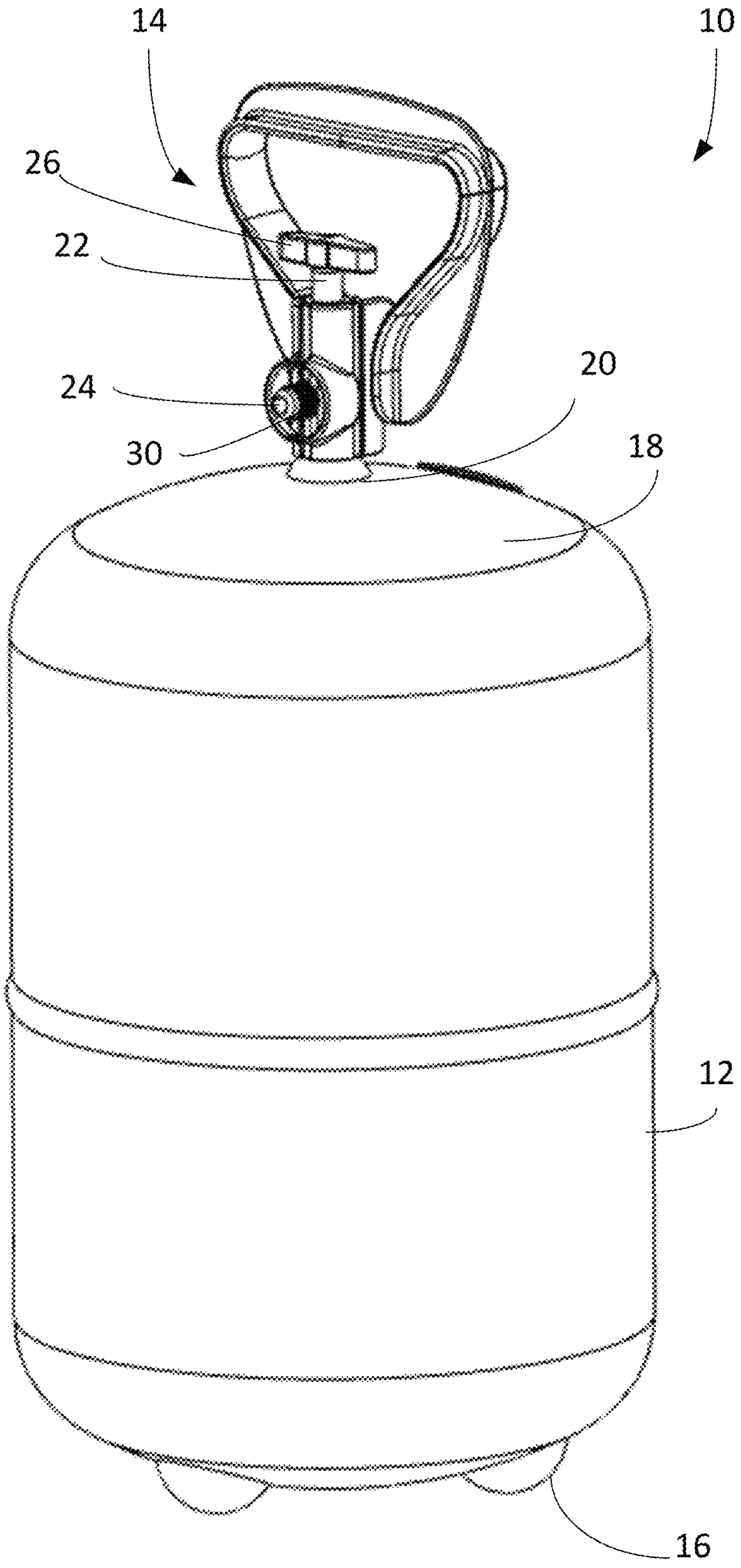
FIG. 1 is a perspective view an exemplary portable cylinder.

Embodiments of the invention relate to methods and apparatuses that relate to a portable cylinder for filling a balloon. The portable cylinder includes a tank having a valve port, a valve coupled to the valve port, the valve including a handle and an outlet port, a nozzle coupled to the outlet port, the nozzle configured to receive the balloon, and a handle assembly including a handle support coupled to the valve and a handle coupled to the handle support. The handle assembly includes a handle support configured to couple to a valve of the cylinder, the handle support including a body having first and second ends circumferentially spaced from one another to define a gap and a longitudinal passage opening to a top and bottom of the body for receiving the valve, and first and second deflectable arms projecting from the body, and a handle rotatably coupled to the handle support, the handle including a top portion, first and second side portions, and an attachment member coupled to the first and second deflectable arms of the handle.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Figure 2:
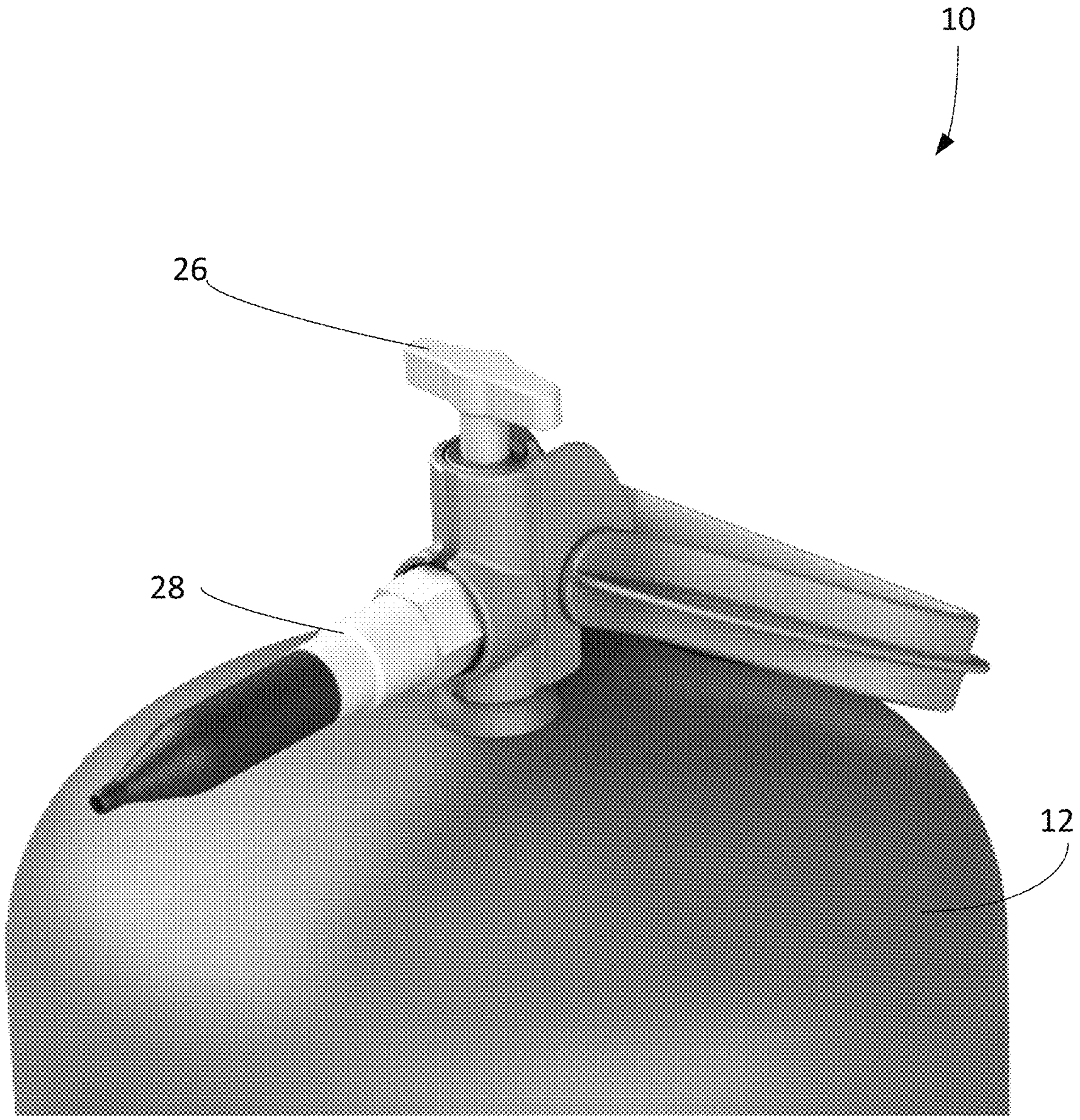
FIG. 2 is a partial perspective view of the portable cylinder.
Figure 3:
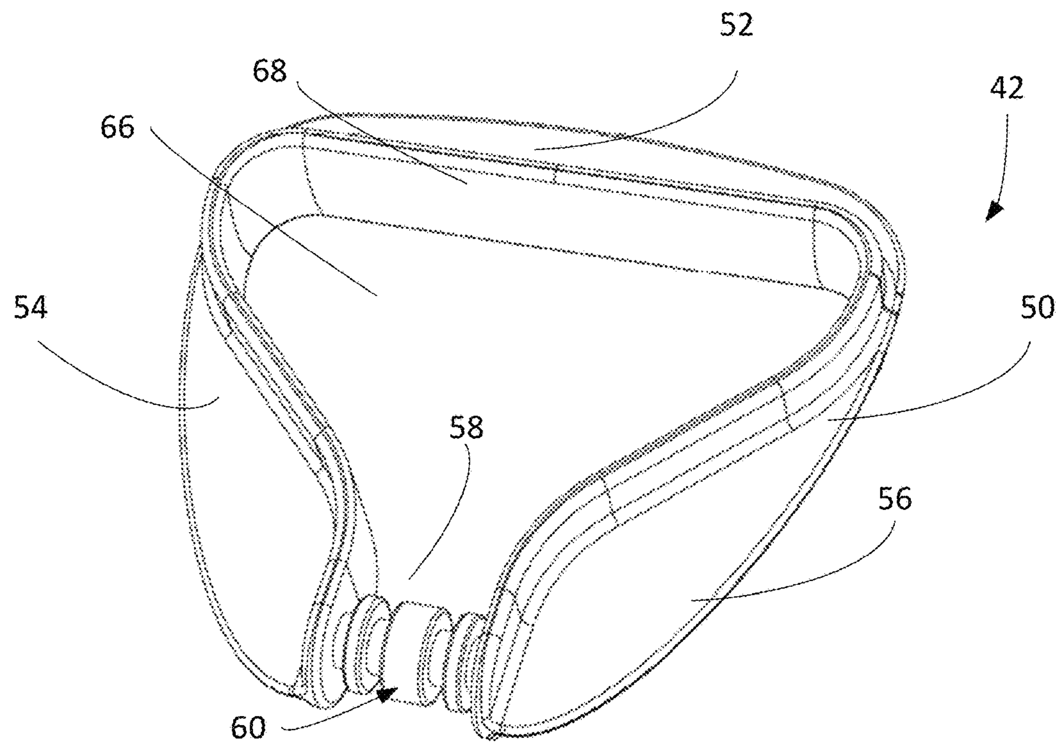
FIG. 3 is a perspective view of a handle of a handle assembly.
Figure 4:
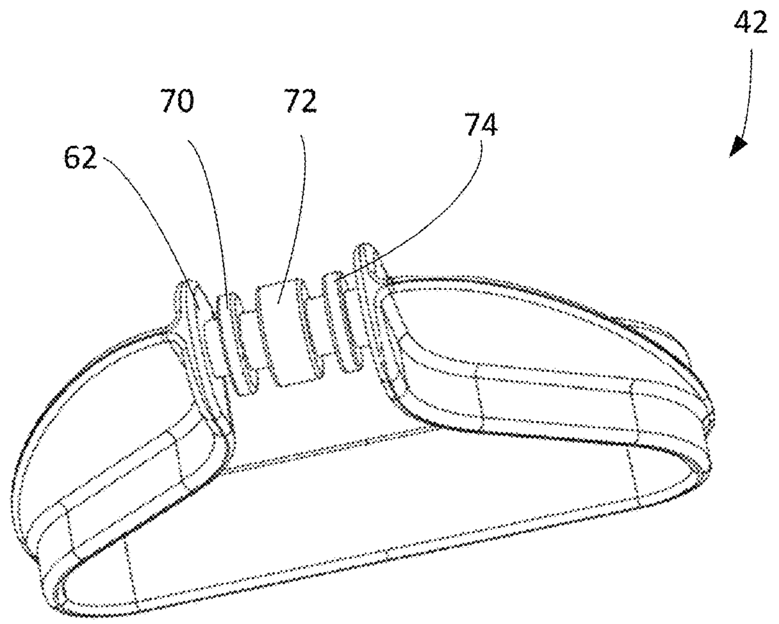
FIG. 4 is another perspective view of the handle.
Figure 5:
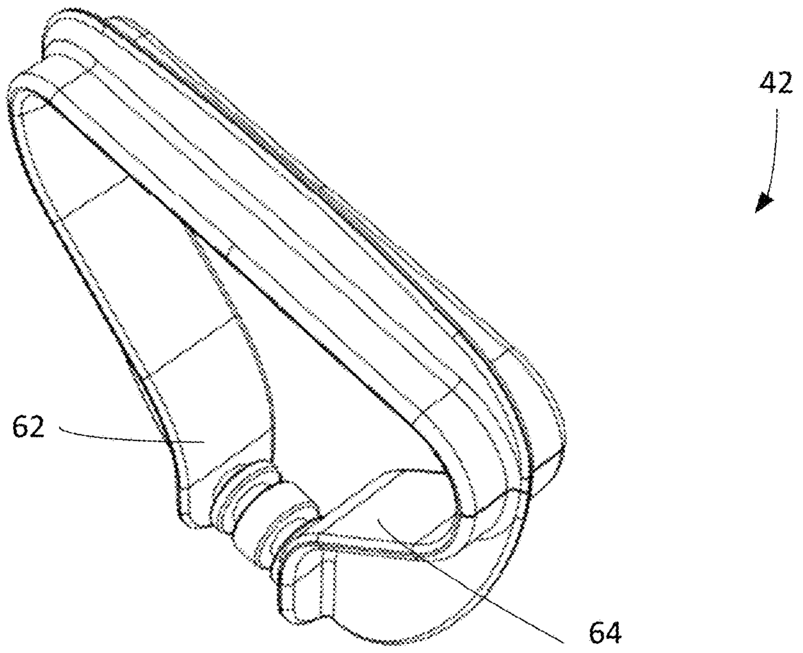
FIG. 5 is still another perspective view of the handle.
Figure 6:
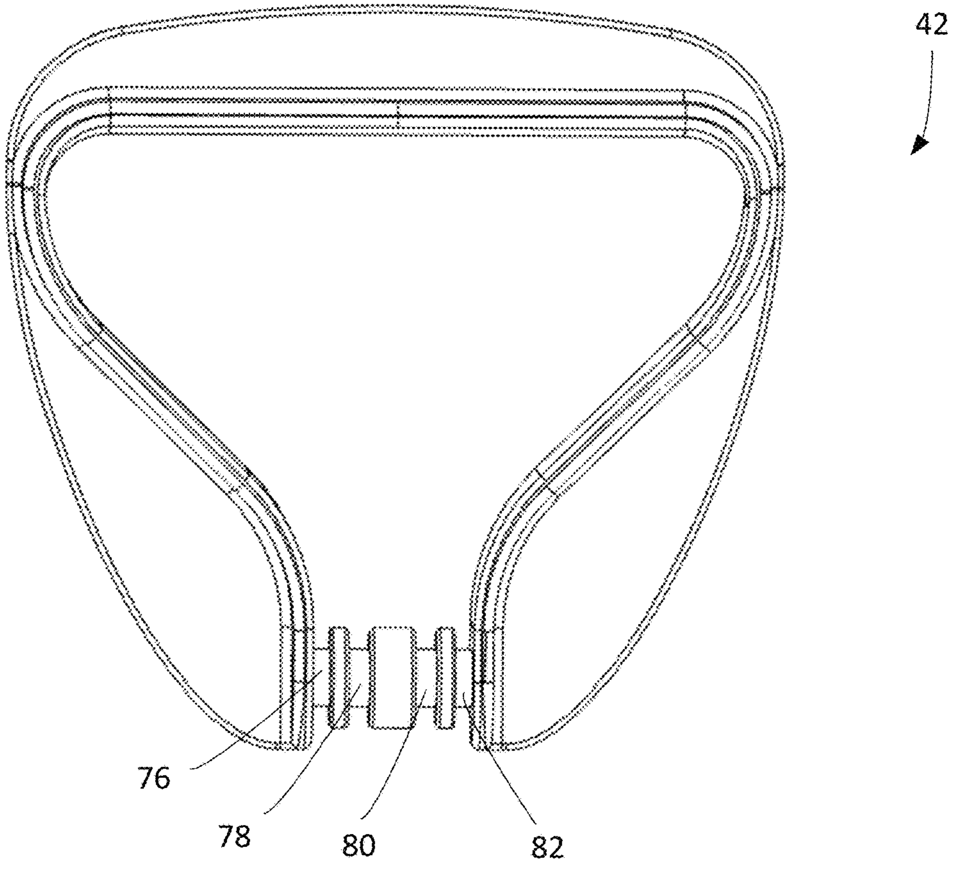
FIG. 6 is a front view of the handle.
Figure 7:
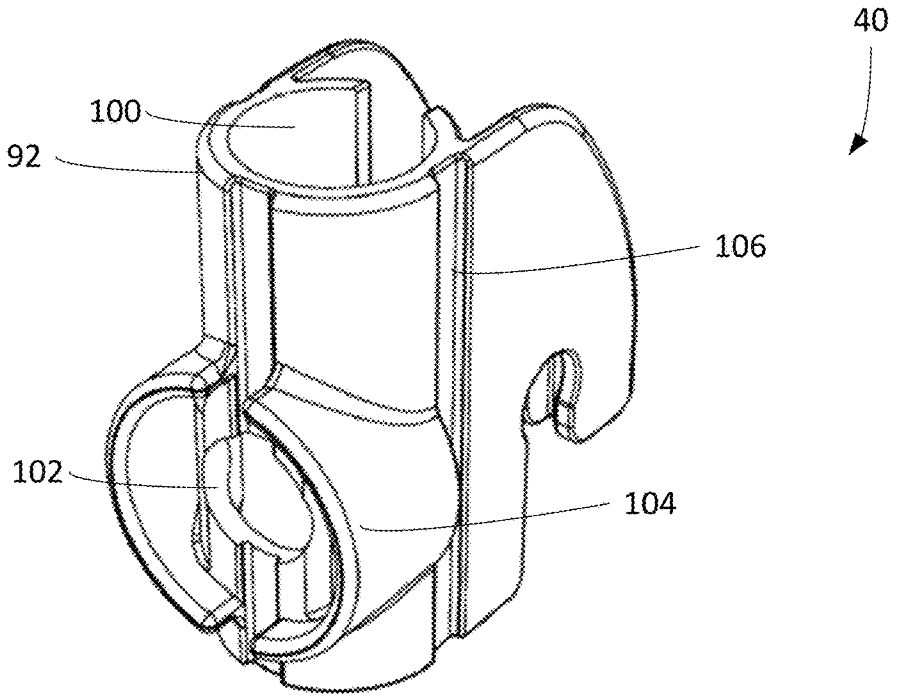
FIG. 7 is a perspective view of a handle support of the handle assembly.
Figure 8:
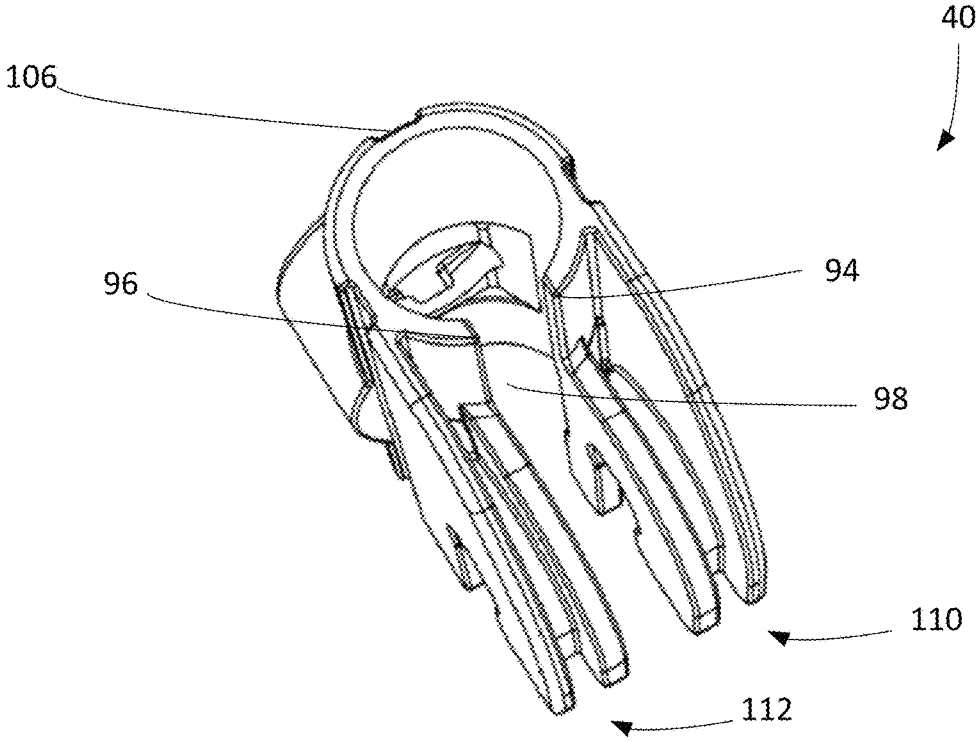
FIG. 8 is another perspective view of the handle support.
Figure 9:
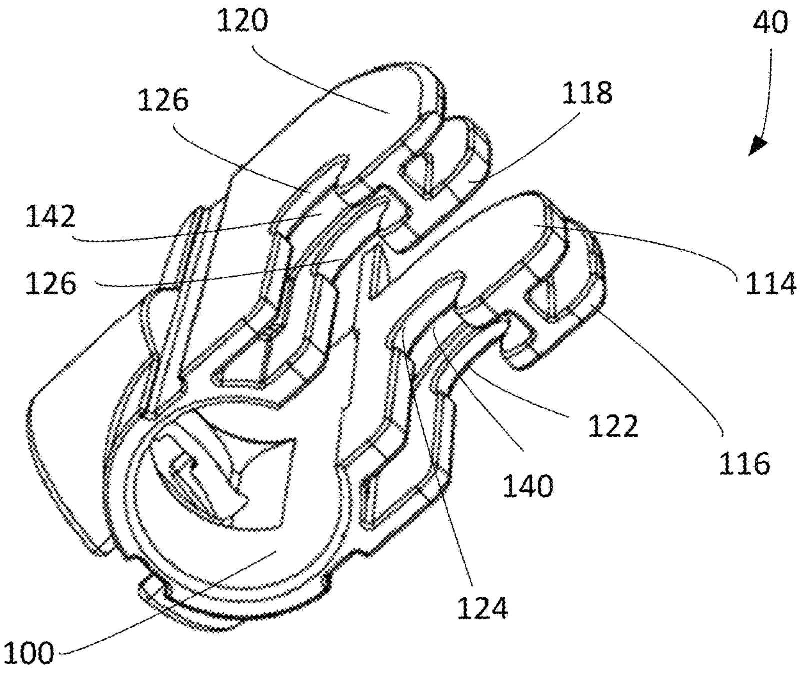
FIG. 9 is still another perspective view of the handle support.
Figure 10:
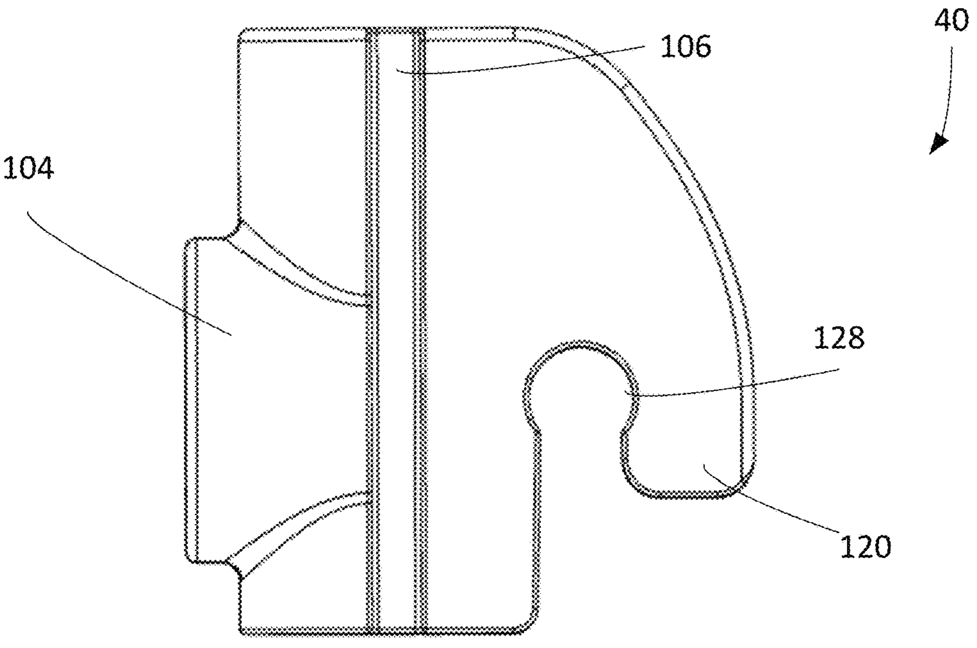
FIG. 10 is a side view of the handle support.
Figure 11:
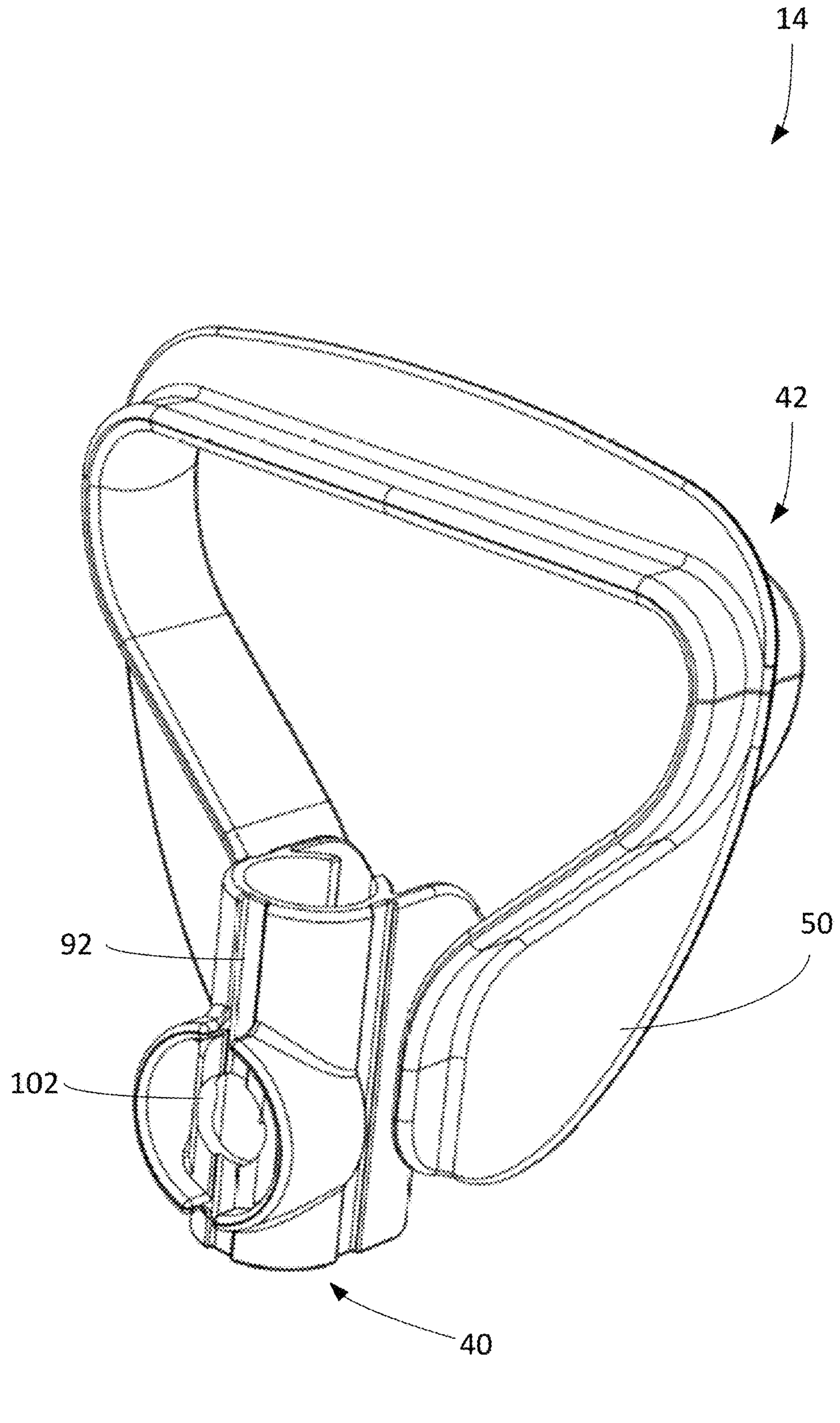
FIG. 11 is a perspective view of the handle assembly.
Figure 12:
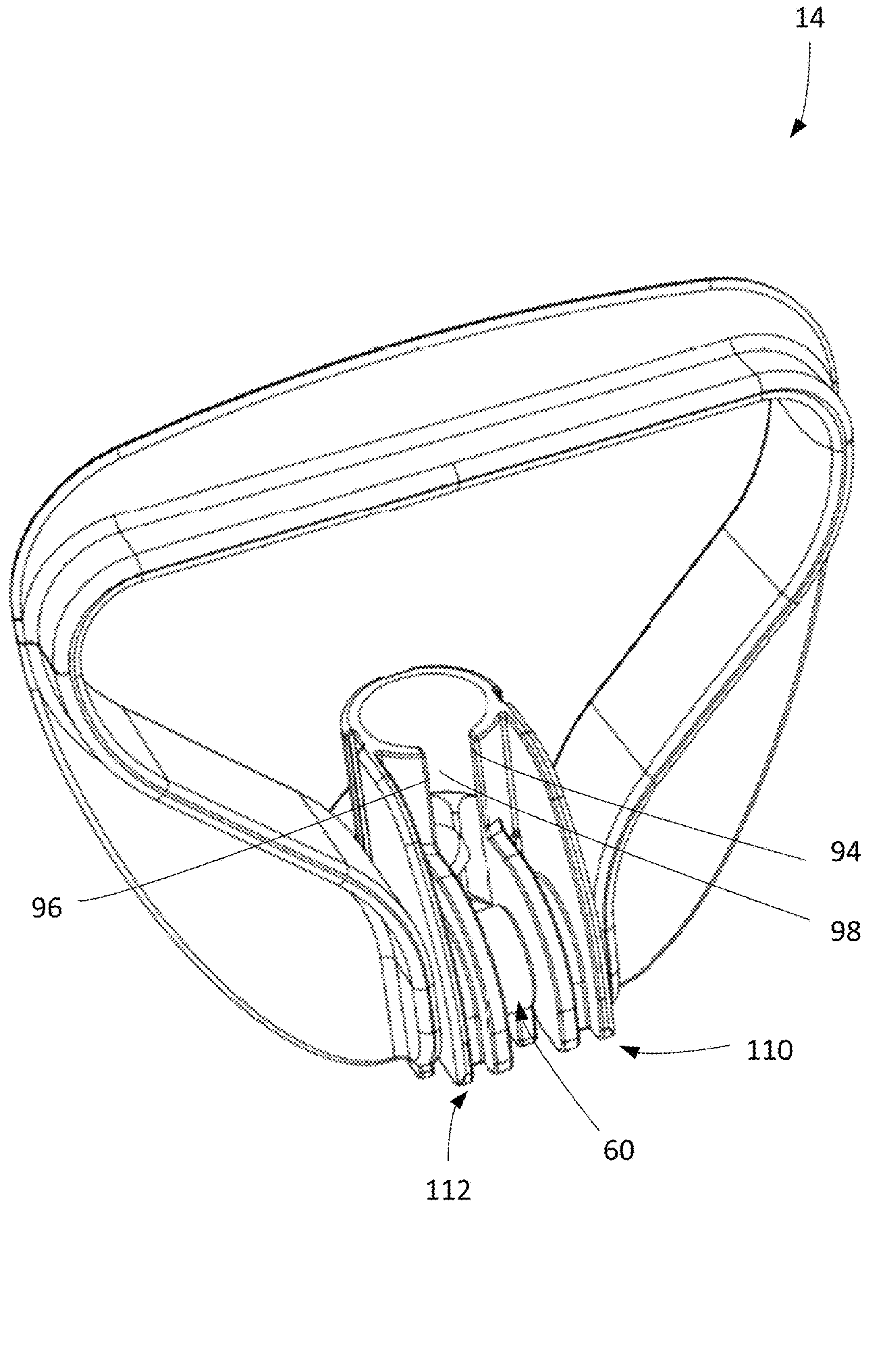
FIG. 12 is another perspective view of the handle assembly.
Figure 13:
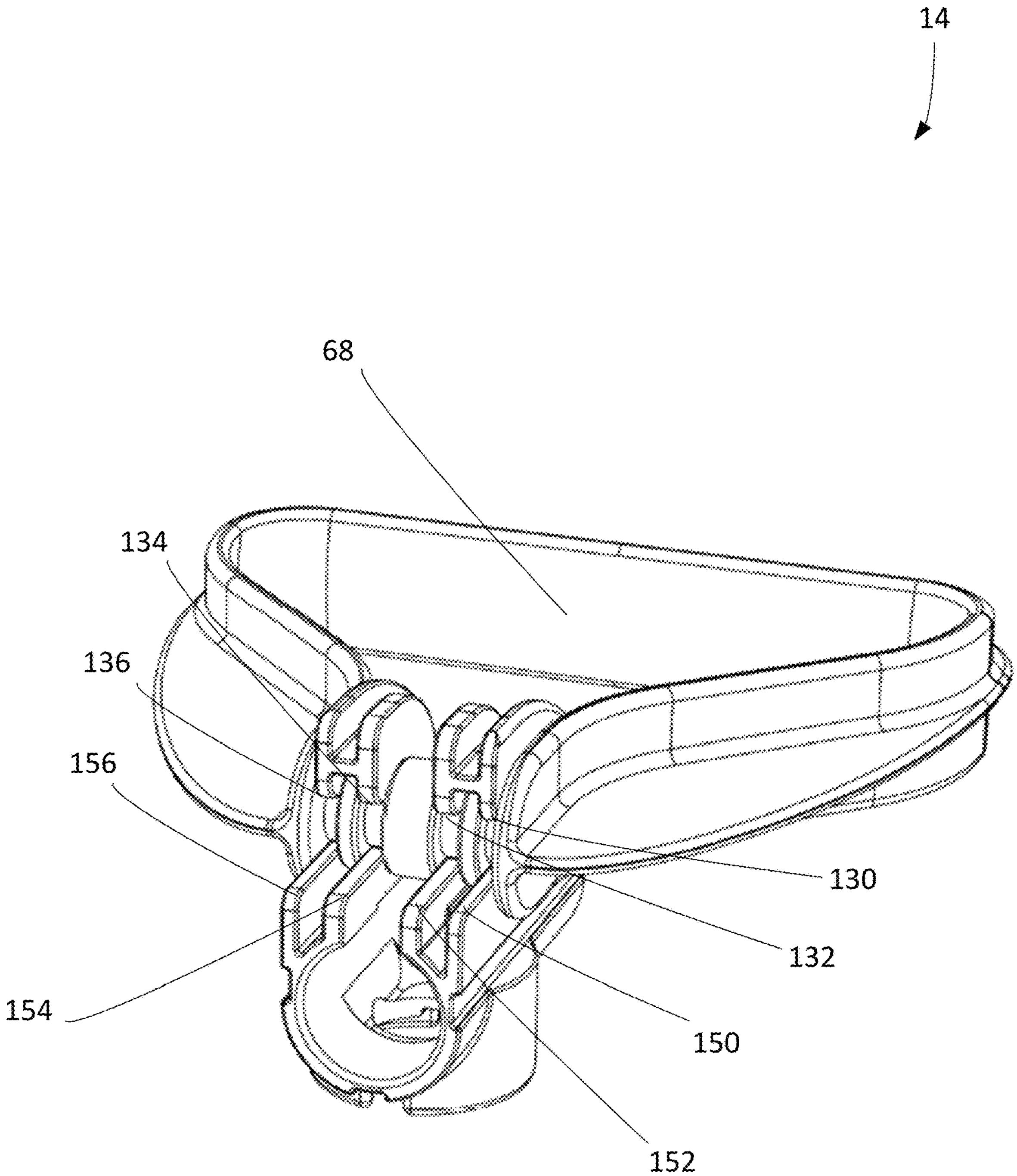
FIG. 13 is still another perspective view of the handle assembly.
Figure 14B:
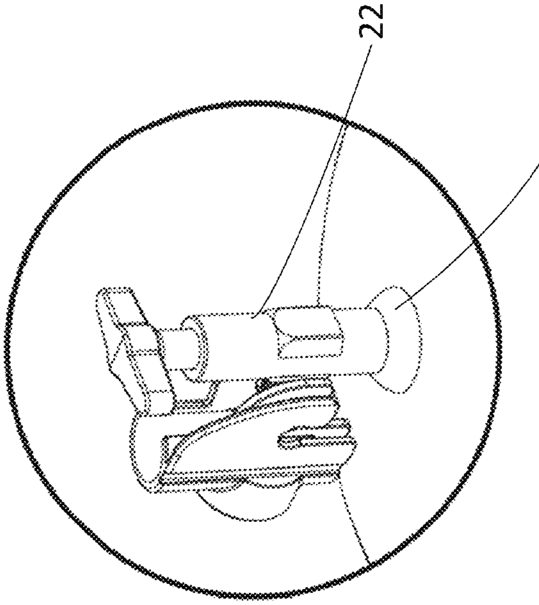
FIG. 14B is a rear detail view of the portable cylinder shown in FIG. 14A.
Figure 14A:
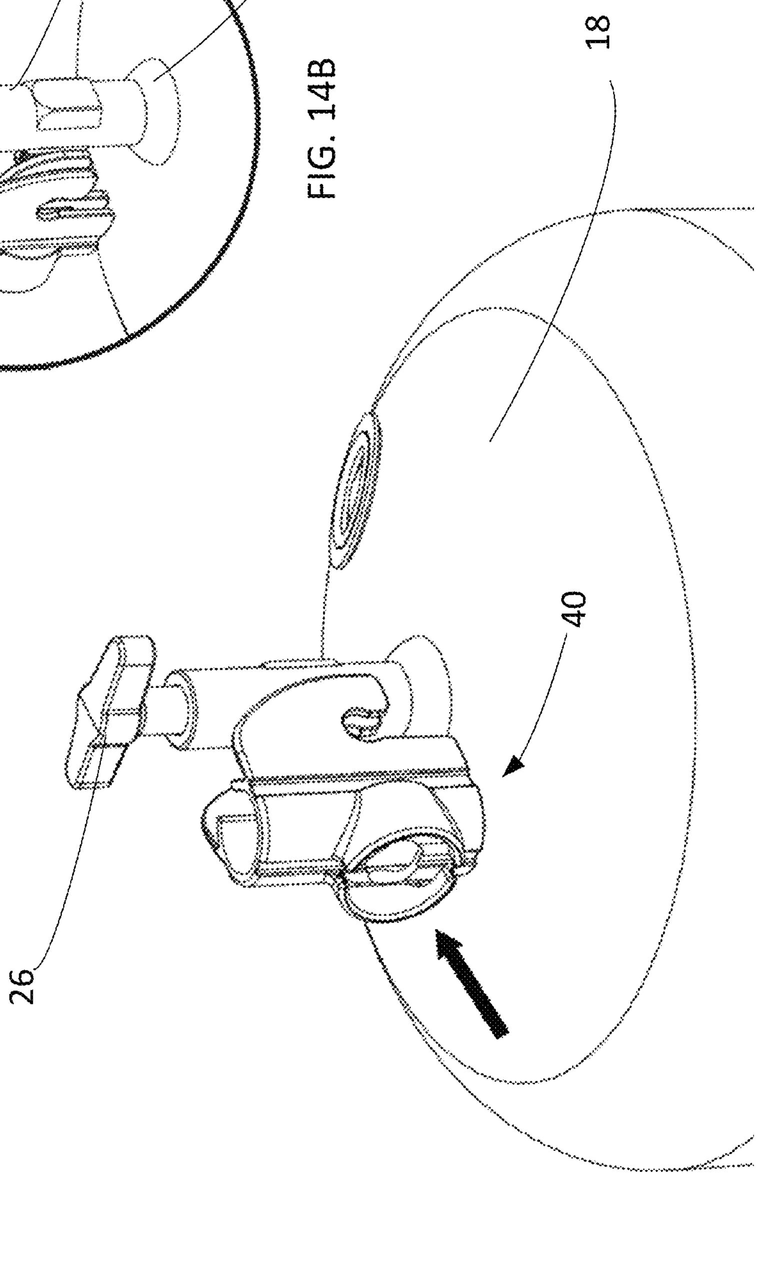
FIG. 14A is a partial perspective view of the portable cylinder during attachment of the handle support.
Figure 15B:
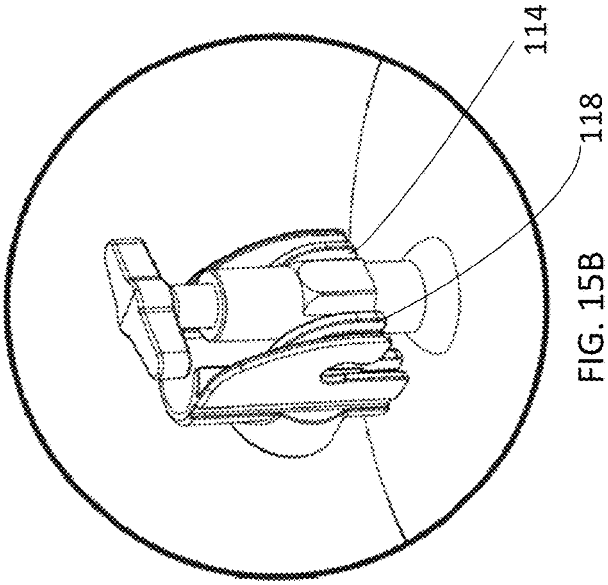
FIG. 15B is a rear detail view of the portable cylinder shown in FIG. 15A.
Figure 15A:
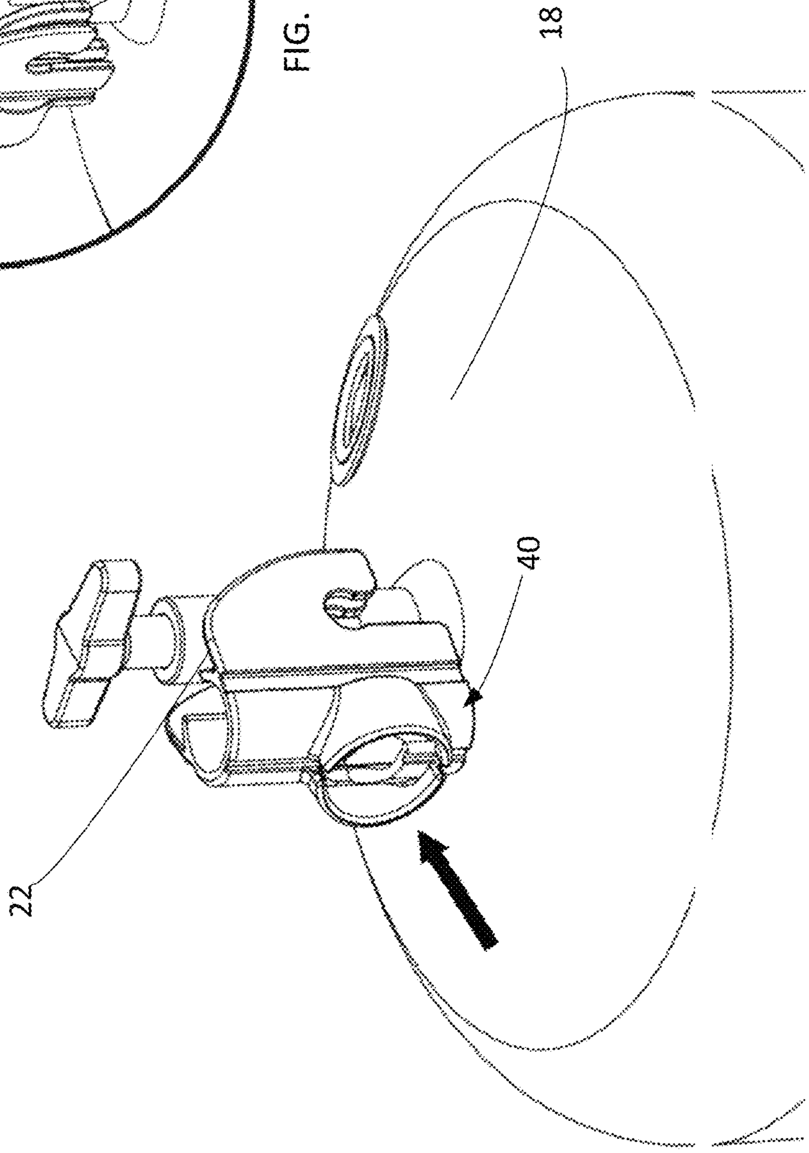
FIG. 15A is another partial perspective view of the portable cylinder during attachment of the handle support.

Turning initially to FIGS. 1 and 2, a portable cylinder is shown generally at reference numeral 10. The portable cylinder 10 includes a tank 12 configured to store a suitable pressurized gas, a handle assembly 14 attached to a top of the gas tank 12, and a plurality of feet 16 at a bottom of the gas tank 12. The gas tank 12 may be made of a suitable material, such as metal, and the handle assembly 14 may be made of a suitable material, such as a non-metal material, such as a polymer, such as plastic. The gas tank 12 may hold any suitable material, such as compressed natural gas, helium, propane, etc. In an embodiment, one or more of the components of the handle assembly 14 may be made from recycled material and/or may be recyclable. The gas tank 12 includes an upper portion 18 having a valve port 20 for receiving a suitable valve 22, such as a shutoff valve. The shutoff valve 22 includes an outlet 24 and a handle 26 to open/close the shutoff valve 22. A suitable nozzle 28, such as a tilt nozzle, may be attached to the outlet 24, such as by threads on the tilt nozzle 28 mating with corresponding threads 30 on the outlet 24. To operate the portable cylinder 10, a user can open the shutoff valve 22 by turning the handle 26, allowing pressurized gas to flow to the outlet 24. A user can then place a balloon, for example, over the tilt nozzle 28, and a user may press against a side of the tilt nozzle 28 to open the tilt nozzle 28 to transfer a portion of the pressurized gas stored in the gas tank into the balloon to expand the balloon.

Referring additionally to FIGS. 3-13, the handle assembly 14 will be discussed in detail. The handle assembly 14 includes a handle support 40 that removably attaches to the shutoff valve 22, and a handle 42 that removably attaches to the handle support 40. The handle 42 may be an ergonomic polymeric handle allow a user to avoid contacting sharp or otherwise hard edges on steel handles.

As shown in FIGS. 3-6, the handle 42 includes a body 50 having a top portion 52 and first and second side portions 54 and 56 extending downward form the top portion 52 and being laterally spaced from one another to define a gap 58 where an attachment member 60 is coupled to inner surfaces 62 and 64 of the respective first and second side portions 54 and 56. The inner surfaces 62 and 64 of the first and second side portions 54 and 56 are spaced a greater distance from one another at the top portion 52 than at the attachment member 60, and the inner surfaces 62 have a curved shaped from their tops towards their bottoms. The curved shape serves as a funnel to align the attachment member 60 with the handle support 40 during attachment of the handle 42 to the handle support 40. The body 50 also includes an opening 66 defined between the top portion 52 and the first and second side portions 54 and 56, and the body 50 and opening 66 define a grip area 68 for a user to grasp the handle 42 to transport the tank. As shown, the body 50 and attachment member 60 are integrally formed, for example by molding, but may be separately formed and attached to one another in a suitable manner, and may be generally trapezoidal in shape along the outer profile.

Referring now to the attachment member 60 in detail, the attachment member 60 is substantially cylindrical in shape and includes at least one projection, and as shown a plurality of projections, such as first, second, and third projections 70, 72, and 74 projecting radially outwardly from the attachment member 60 along its length. The projections 70, 72, and 74 are laterally spaced from the inner surfaces 62 and 64 of the body 50 of the handle 42 and laterally spaced from one another. As shown, the projections 70, 72, and 74 have substantially the same diameter but it will be appreciated that the projections could be designed with varying diameters. For example, the second projection 72 may be designed with a diameter larger or smaller than the diameter of the first and third projections 70 and 74.

The first projection 70 may be spaced from the inner surface 62 of the body 50 by a first spacer 76 of the attachment member 60 and from the second projection 72 by a second spacer 78, and the third projection 74 may be spaced from second projection 72 by a third spacer 80 and from the inner surface 64 of the body 50 by a fourth spacer 82. The first and third projections 70 and 74 have substantially the same thickness as one another in a direction extending between the inner surfaces 62 and 64, and the projection 72 has a thickness that is greater than the thicknesses of the first and third projections 70 and 74. Similarly, the first and fourth spacers 76 and 82 have substantially the same thickness as one another in the direction extending between the inner surfaces 62 and 64, and the second and third spacers 78 and 80 have a thickness that is substantially the same as one another and that is greater than the thicknesses of the first and fourth spacers 76 and 82. The first, second, and third projections 70, 72, and 74 and the first, second, third, and fourth spacers 76, 78, 80, and 82 may have a substantially cylindrical shape to allow for rotation of the handle 42 relative to the handle support 40.

Turning to FIGS. 7-10, the handle support 40 will be described in detail. The handle support 40 includes a body 92 that is substantially cylindrical with first and second ends 94 and 96 circumferentially spaced from one another to define a gap 98 at a rear of the body 92. The body 92 also includes a longitudinal passage 100 opening to a top and bottom of the body 92 and to the gap 98, and an opening 102 at a front of the body 92 opening to the passage 100 through which the outlet 24 of the shutoff valve 22 is configured to extend. A collar 104 may be provided that projects from the front of the body 92 around the opening 102 to define a cavity to partially surround an end of the tilt nozzle 28 coupled to the outlet 24. One or more reduced thickness portions 106, and as shown a plurality of circumferentially spaced reduced thickness portions 106 may be spaced around the body 92 to assist the body 92 to deflect radially outward when being attached to the shutoff valve 22 and then to return to its original shape once attached. The reduced thickness portions 106 may extend from the top of the body 92 to the bottom of the body and have a thickness in a circumferential direction. As shown the reduced thickness portions 106 have substantially the same thickness but it will be appreciated that the reduced thickness portions 106 may have varying thicknesses.

The handle support 40 also includes first and second deflectable arms 110 and 112 projecting rearward from the body 92 at the first and second ends 94 and 96, the first and second deflectable arms 110 and 112 being laterally spaced from one another at the gap 98. The first and second deflectable arms 110 and 112 are substantially J-shaped with a vertical portion extending in a direction along the longitudinal axis and a curved portion projection rearward of the vertical portion. The first deflectable arm 110 includes an inner arm member 114 projecting rearward from the first end 94 and an outer arm member 116 laterally outwardly spaced from the inner arm member 114, and the second deflectable arm 112 includes an inner arm member 118 projecting rearward from the second end 96 and an outer arm member 120 laterally outwardly spaced from the inner arm member 118. The outer arm members 116 and 120 each include a slot 122, 128 opening to a bottom of the respective arm member 116, 120 for receiving the first spacer 76 and fourth spacer 82 respectively. Similarly, the inner arm members 114 and 118 each include a slot 124, 126 opening to a bottom of the respective arm member 114, 118 for receiving the second spacer 78 and third spacer 80 respectively. The slots 122, 124, 126, and 128 are aligned with one another in a direction perpendicular to the longitudinal passage, and each slot 122, 124, 126, and 128 has a substantially circular portion for receiving the first, second, third, and fourth spacers 76, 78, 80, and 82 respectively and a substantially square portion extending therefrom defining an opening 130, 132, 134, and 136 of each slot 122, 124, 126, and 128. The opening 130, 132, 134, and 136 of each slot 122, 124, 126, and 128 is smaller than the diameter of the circular portion of the slots 122, 124, 126, and 128 to hold the first, second, third, and fourth spacers 76, 78, 80, and 82 in the respective slot via a snap connection.

The inner and outer arm members 114 and 116 define therebetween a cavity 140 positioned above the slots 122 and 124 for receiving the projection 70 of the attachment member 60, and the inner and outer arm members 118 and 120 define therebetween a cavity 142 positioned above the slots 126 and 128 for receiving the projection 74 of the attachment member 60. The projection 72 is received in an area between the inner arm members 114 and 118 and configured to abut the sides of the inner arm members 114 and 118. The positioning of the projections 70 and 74 in the cavities 140 and 142, the positioning of the projection 72 between the inner arm members 114 and 118, and the positioning of the inner surfaces 62 and 64 abutting outer surfaces of the outer arm members 116 and 120 prevents lateral movement of the handle 42 relative to the handle support 40. In an embodiment, the projections 70 and 74 can snap into the respective cavities 140 and 142 to provide extra attachment of the handle 42 to the handle support 40.

Turning now to FIGS. 14-23, the attachment of the handle assembly 14 onto the tank 12 will be described in detail.

Figure 16B:
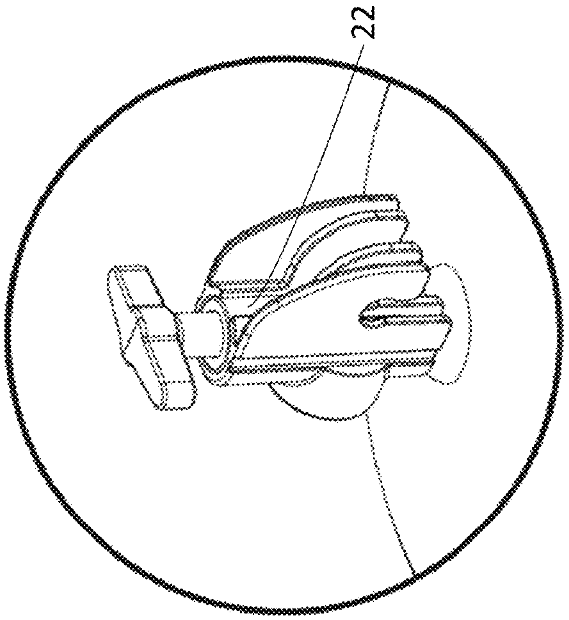
FIG. 16B is a rear detail view of the portable cylinder shown in FIG. 16A.
Figure 16A:
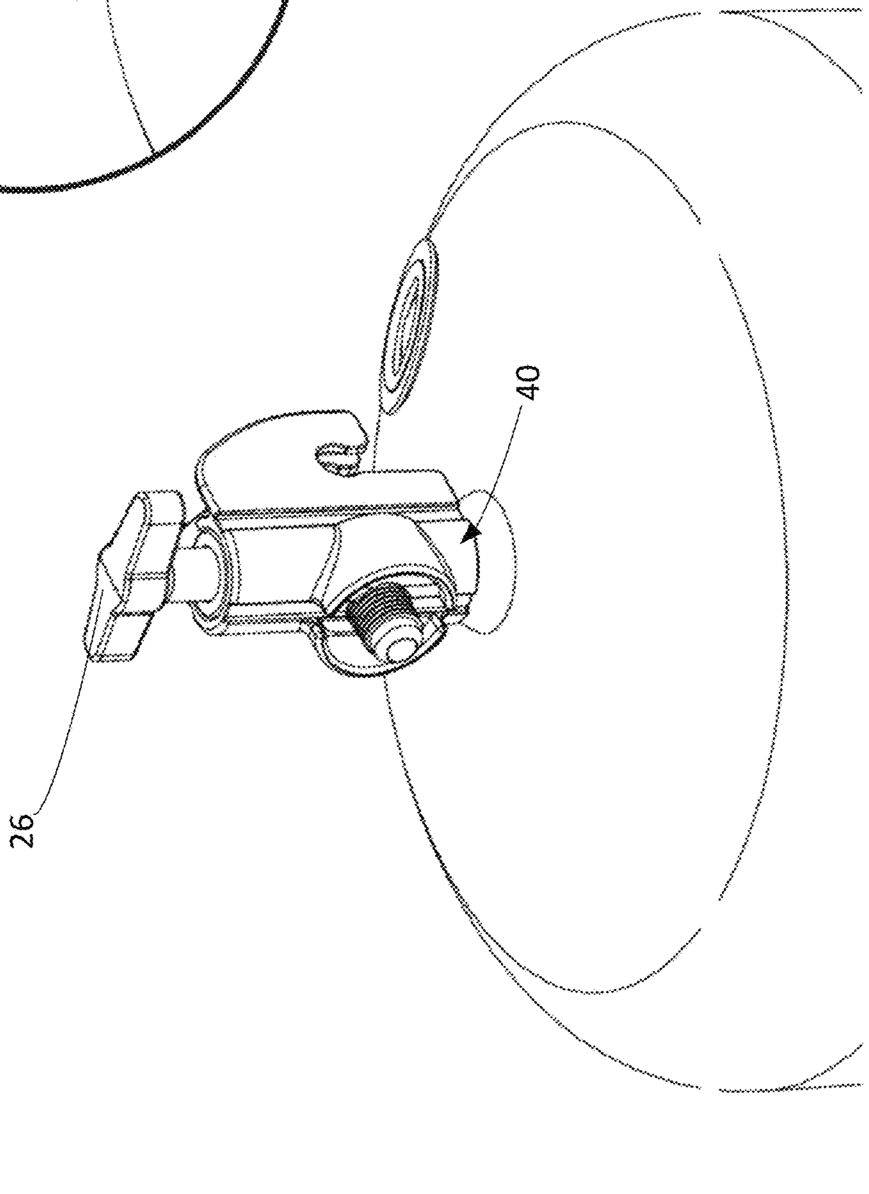
FIG. 16A is still another partial perspective view of the portable cylinder during attachment of the handle support.

Turning initially to FIGS. 14A-15B, the handle support 40 is advanced towards the shutoff valve 22 with the opening 102 aligned with the outlet 24 of the shutoff valve 22 as indicated by the arrow. When the inner arm members 114 and 118 contact the shutoff valve 22, which has a diameter greater than the laterally spacing between the inner arm members 114 and 118, the first and second deflectable arms 110 and 112 are deflected outward thereby causing the first and second ends 94 and 96 to move outward away from one another and widening the gap 98. As shown in FIGS. 16A and 16B, the handle support 40 is advanced until the outlet 24 of the shutoff valve 22 extends through the opening 102 of the handle support 40 and the shutoff valve 22, which has an outer diameter substantially equal to or less than the diameter of the longitudinal passage 100 of the handle support 100, is disposed in the longitudinal passage 100. In this position, the first and second deflectable arms 110 and 112 return to their original position.

Figure 17:
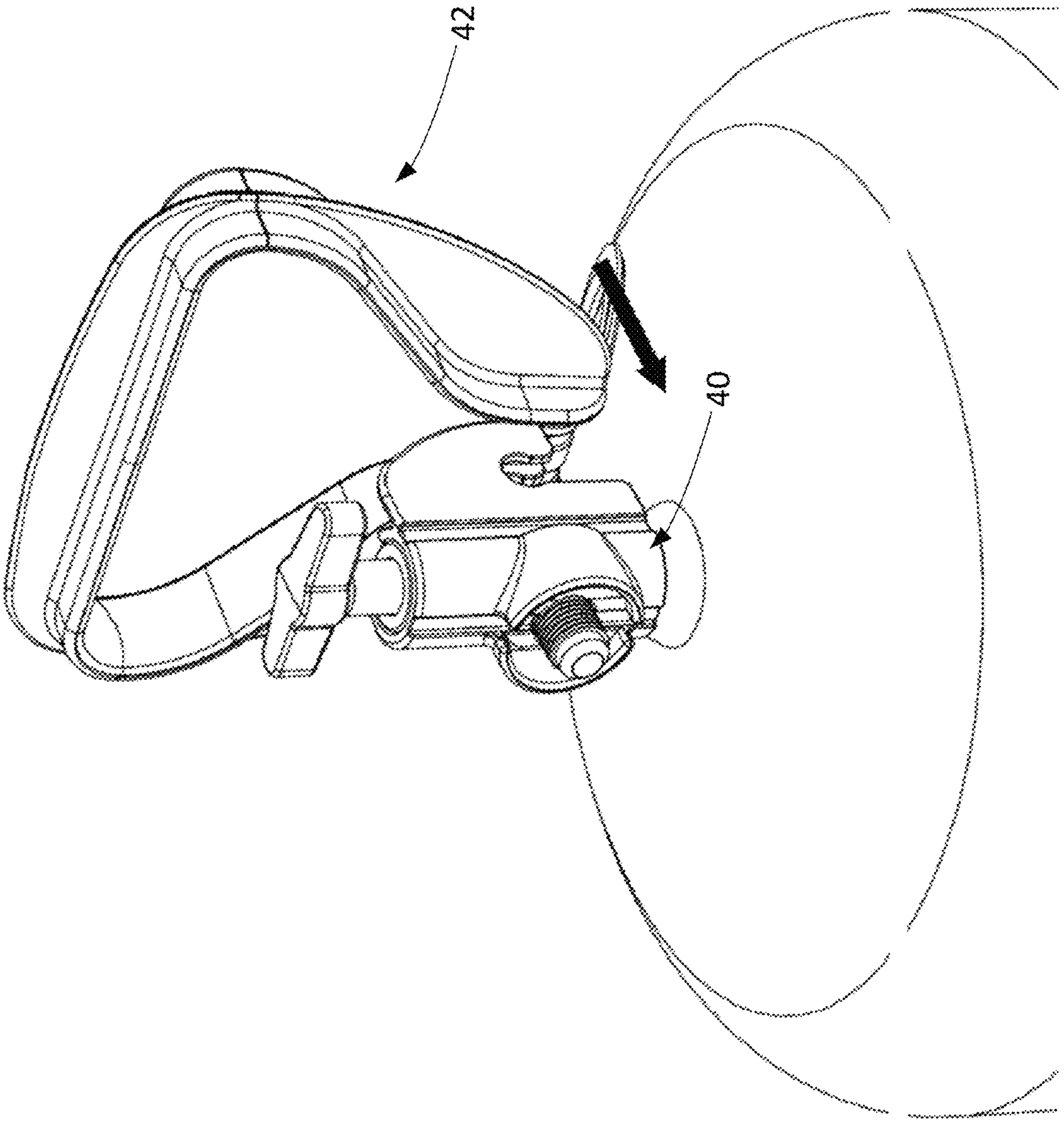
FIG. 17 is a partial perspective view of the portable cylinder during attachment of the handle.
Figure 18B:
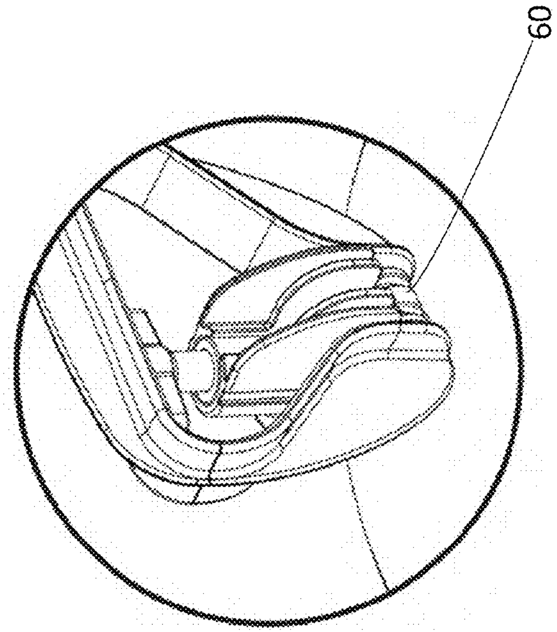
FIG. 18B is a rear detail view of the portable cylinder shown in FIG. 18A.
Figure 18A:
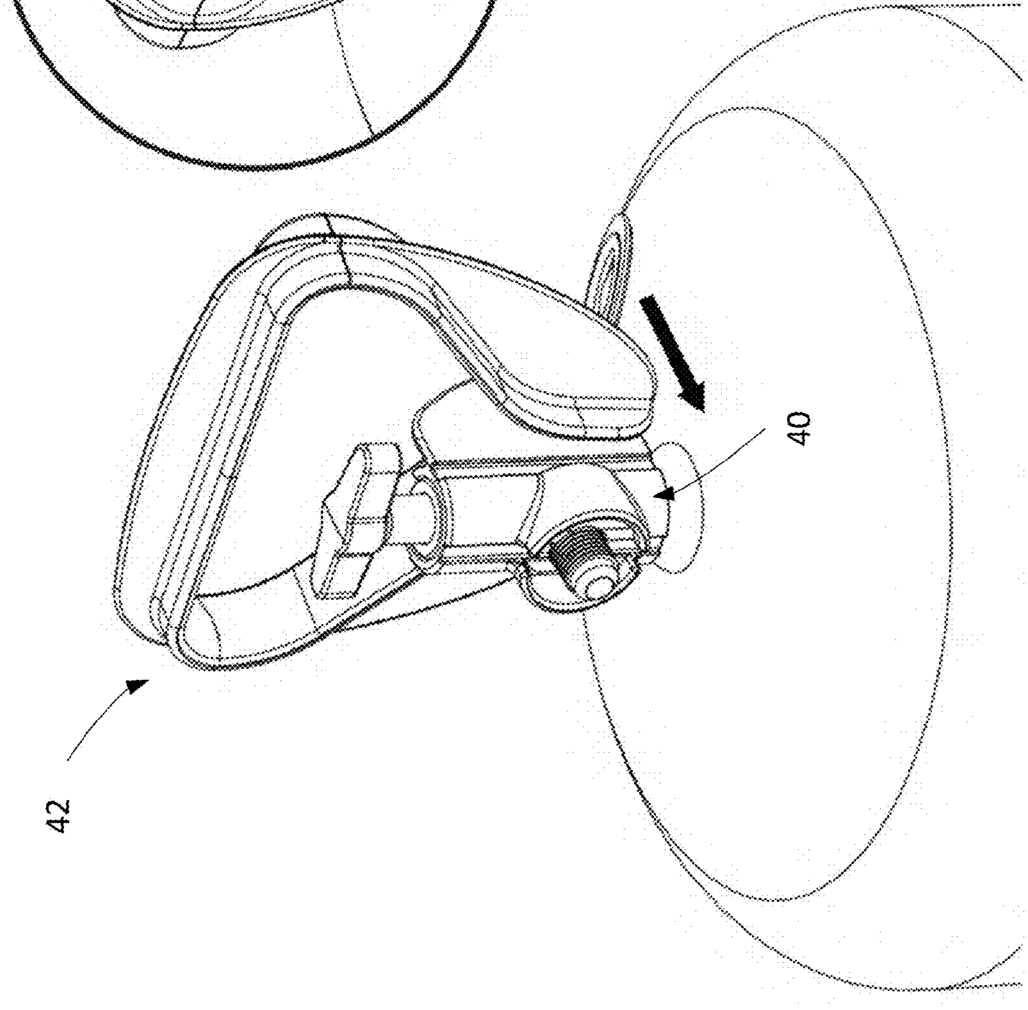
FIG. 18A is another partial perspective view of the portable cylinder during attachment of the handle.
Figure 19B:
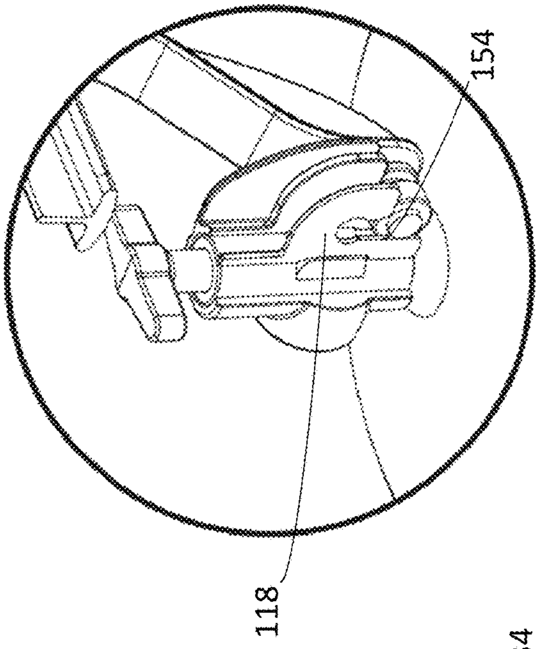
FIG. 19B is a cross-sectional view of the portable cylinder of FIG. 18B.
Figure 19A:
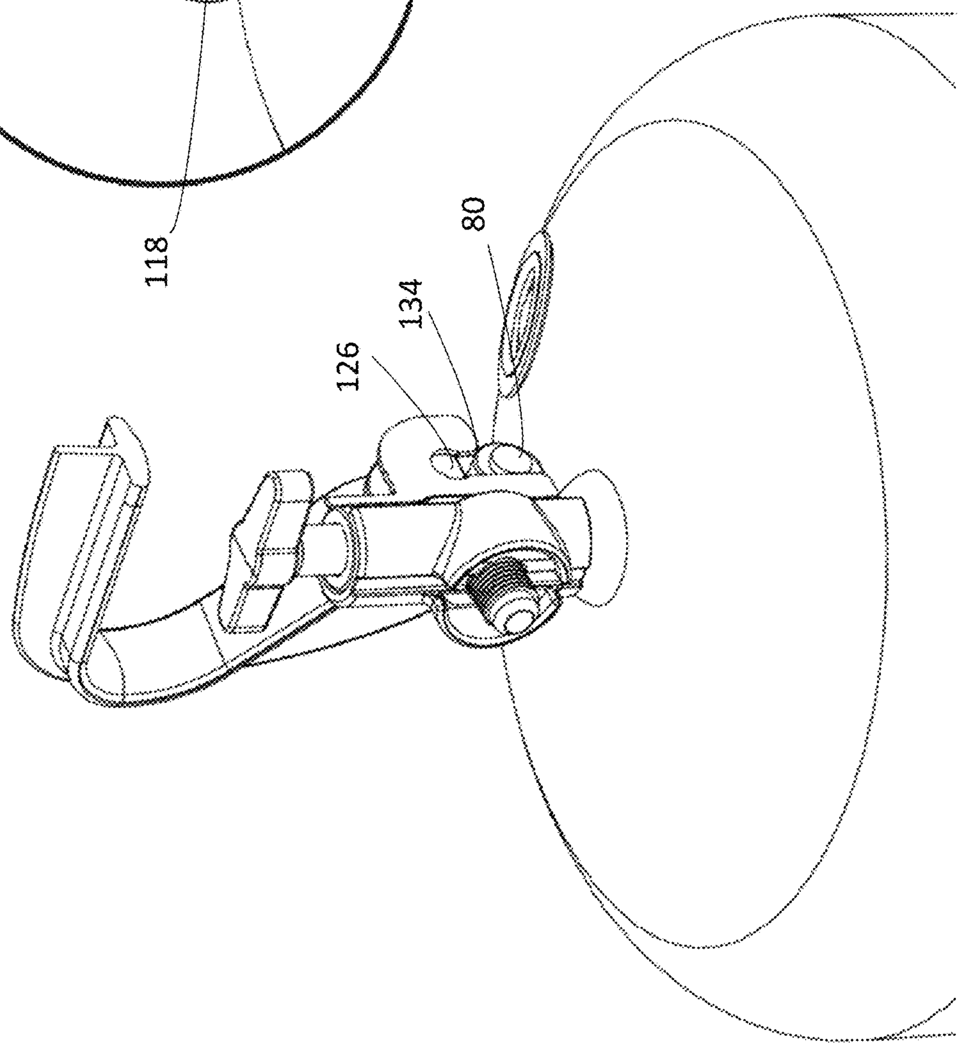
FIG. 19A is a cross-sectional view of the portable cylinder of FIG. 18A.

Turning now to FIG. 17, the handle 42 is then advanced towards the handle support 40 as indicated by the arrow, with the handle 42 being aligned with the handle support 40 such that the handle support 40 is received in the opening 66 in the handle 42. The curved inner surfaces 62 and 64 of the first and second side portions 54 and 56 serve as a funnel to align the handle support 40 and handle 42 and to position the handle support 40 above the attachment member 60 in the gap 58. As shown in FIGS. 18A-19B, the handle 42 is advanced until the attachment member 60 abuts a respective rear-facing portion 150, 152, 154, and 156 of each arm member 114, 116, 118, and 120 below the slots 122, 124, 126, and 128.

Figure 20B:
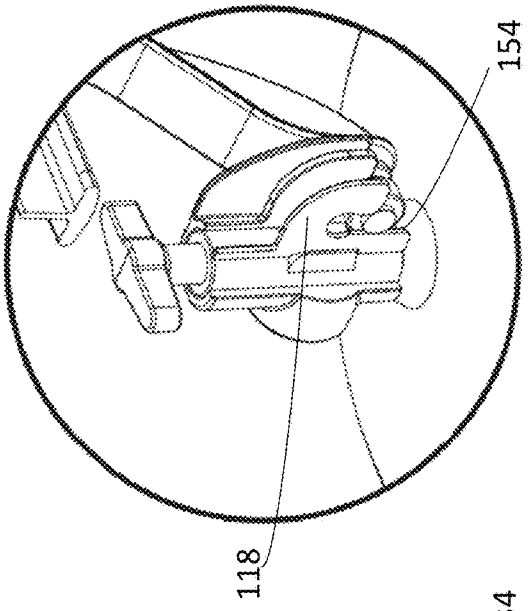
FIG. 20B is a cross-sectional rear detail view of the portable cylinder shown in FIG. 20A
Figure 20A:
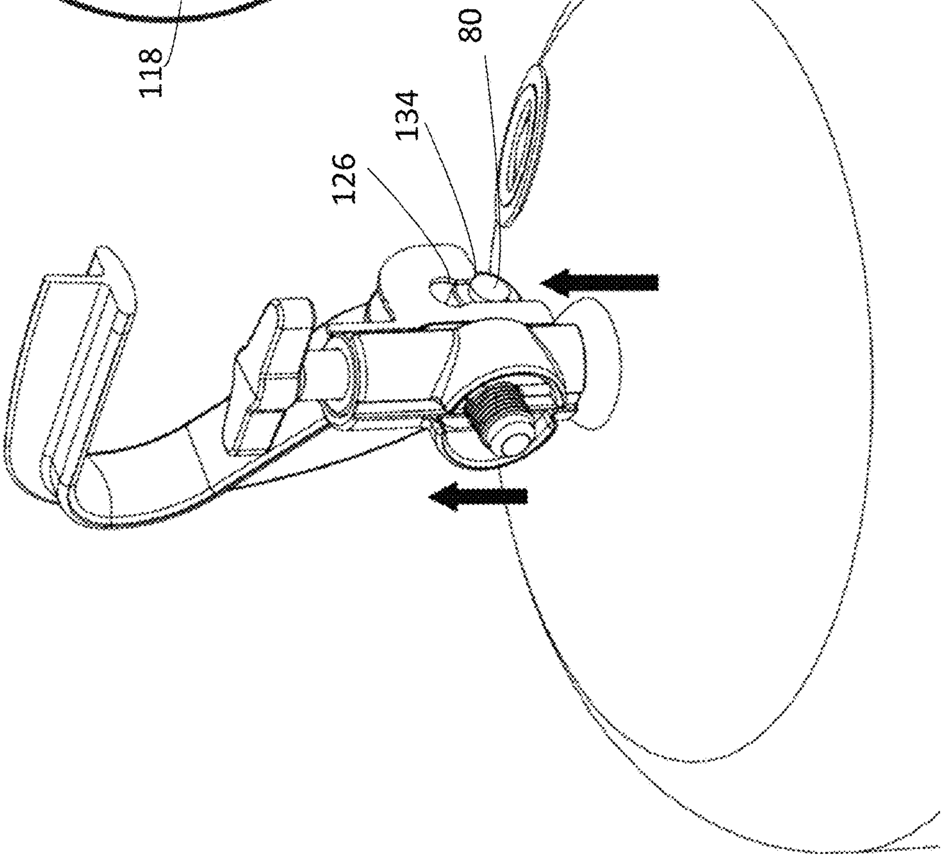
FIG. 20A is a cross-sectional view of the portable cylinder during attachment of the handle.
Figure 21B:
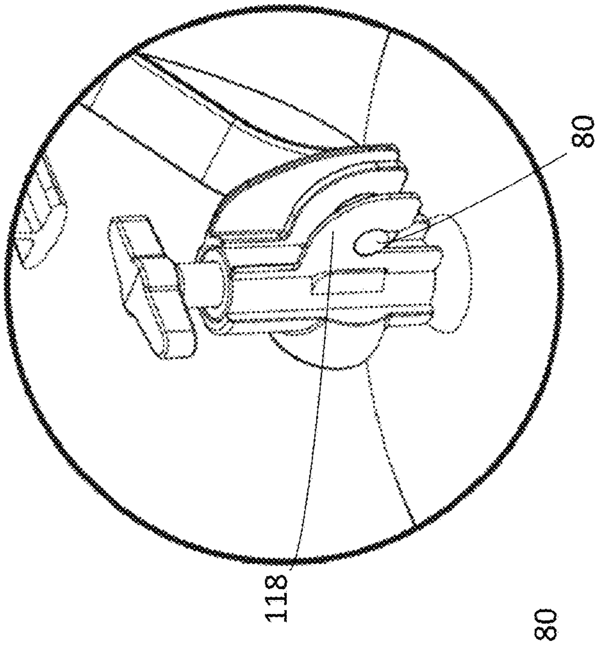
FIG. 21B is a cross-sectional rear detail view of the portable cylinder shown in FIG. 21A
Figure 21A:
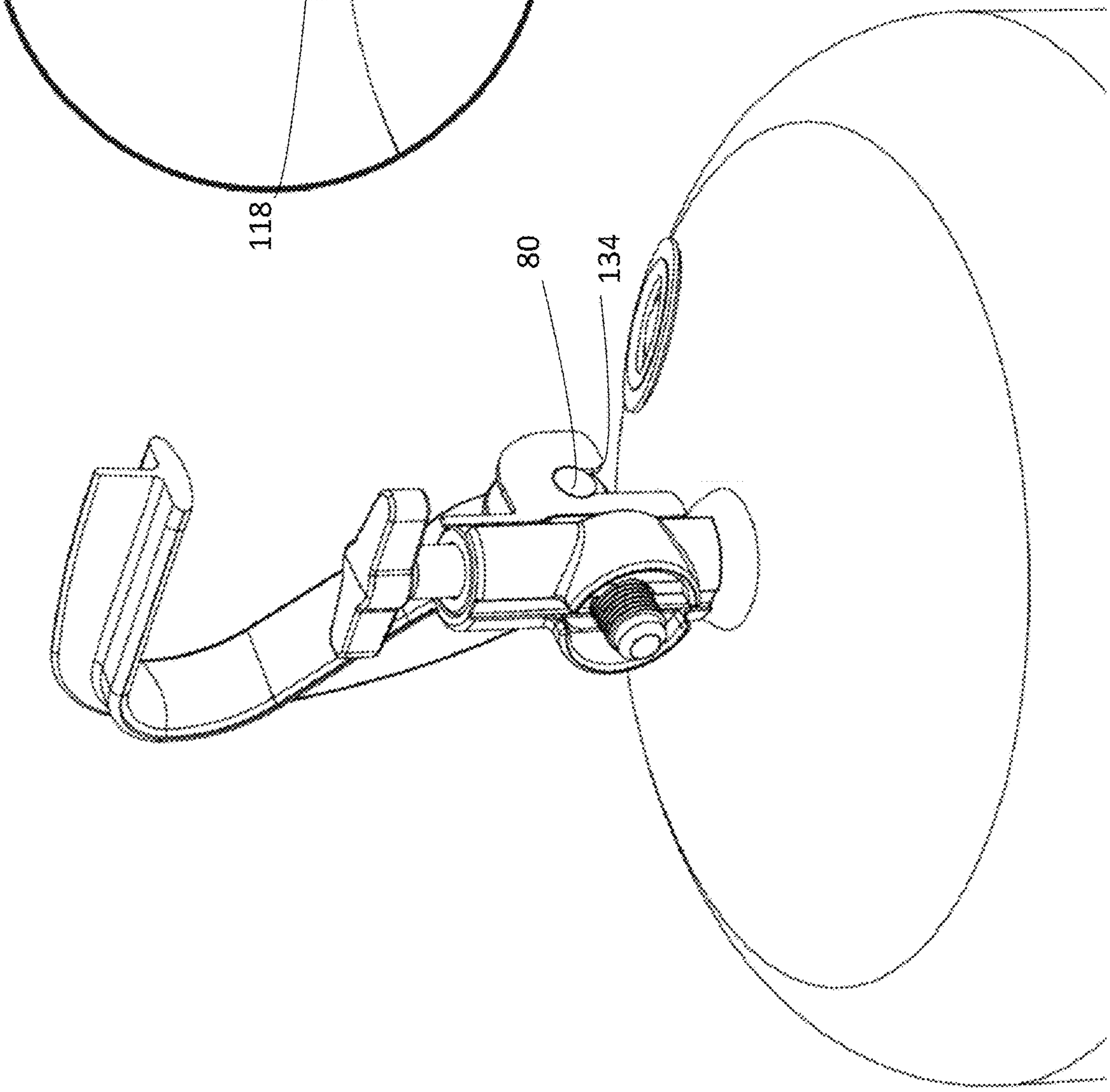
FIG. 21A is a cross-sectional view of the portable cylinder showing the handle attached to the handle support.
Figure 22B:
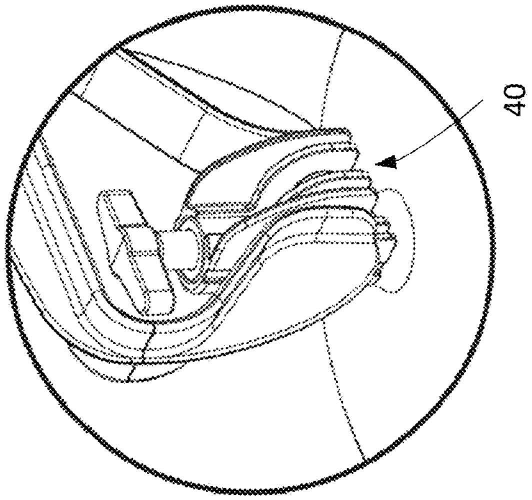
FIG. 22B is a rear detail view of the portable cylinder shown in FIG. 22A.
Figure 22A:
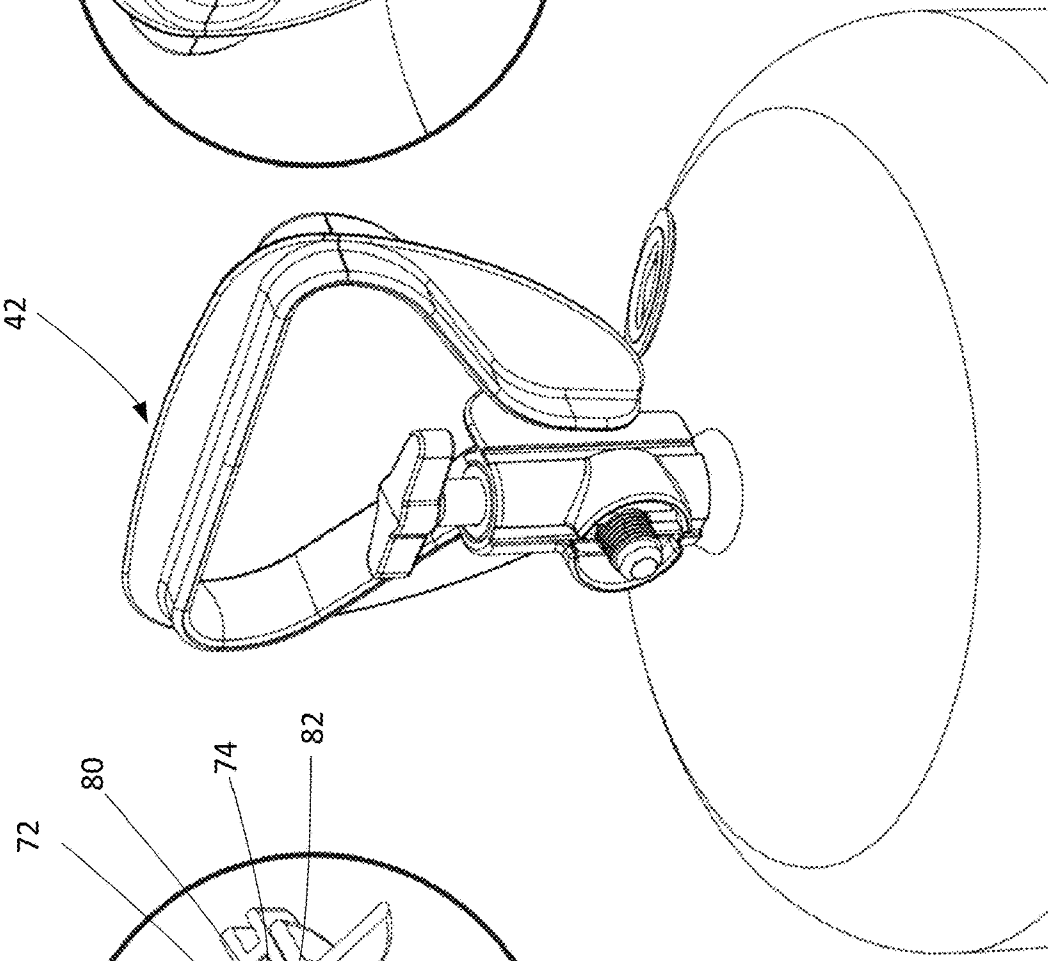
FIG. 22A is a perspective view of the portable cylinder showing the handle attached to the handle support with the handle in a first position.
Figure 22C:
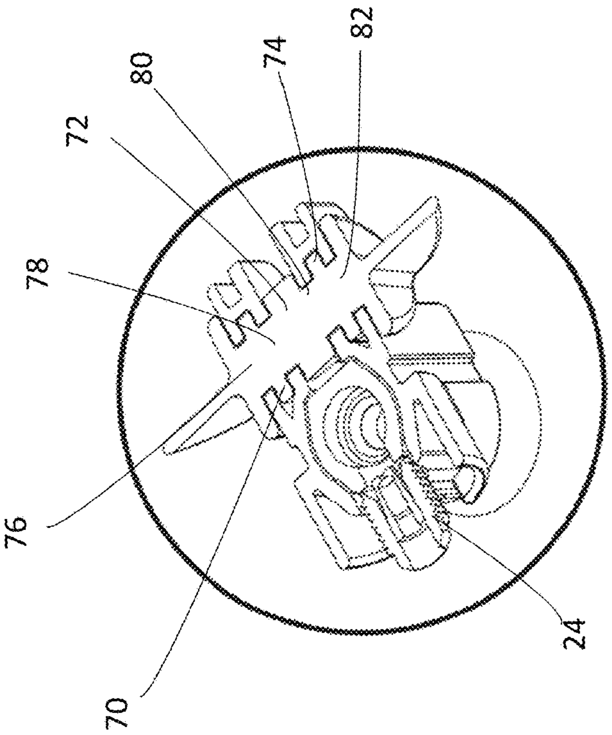
FIG. 22C is another cross-sectional view showing the handle attached to the handle support.

Turning now to FIGS. 20A and 20B, the handle 42 is then moved upward relative to the handle support 40 as indicated by the arrows until the attachment member 60 contacts the opening of the slots 122, 124, 126, and 128. As shown, the diameter of the first, second, third, and fourth spacers 76, 78, 80, and 82 is larger than the opening 130, 132, 134, and 136 of each respective slot 122, 124, 126, and 128. The handle 42 is then moved further upward relative to the handle support 40 causing a portion of the inner and outer arm members 114 and 116 and the inner and outer arm members 118 and 120 to deflect away from the rear facing portions 150, 152, 154, and 156 as shown in FIGS. 21A and 22B. The deflection of the arm members 114, 116, 118, and 120 allows the first, second, third, and fourth spacers 76, 78, 80, and 82 to be received in the respective slot 122, 124, 126, and 128, which has a diameter larger than the diameter of the respective opening in the slot and substantially equal to the diameter of the respective first, second, third, and fourth spacers 76, 78, 80, and 82. The inner and outer arm members 114 and 116 and the inner and outer arm members 118 and 120 then move back to their original positions thereby holding the first, second, third, and fourth spacers 76, 78, 80, and 82 within the slots 122, 124, 126, and 128 via a snap connection. FIG. 22C is a cross-section illustrating the first, second, third, and fourth spacers 76, 78, 80, and 82 being received in the respective slot 122, 124, 126, and 128, the first and third projections 70 and 74 being received in the respective cavities 140 and 142 between the inner and outer arm members, and the second projection 72 being received between the inner arm members 114 and 118.

Figure 23:
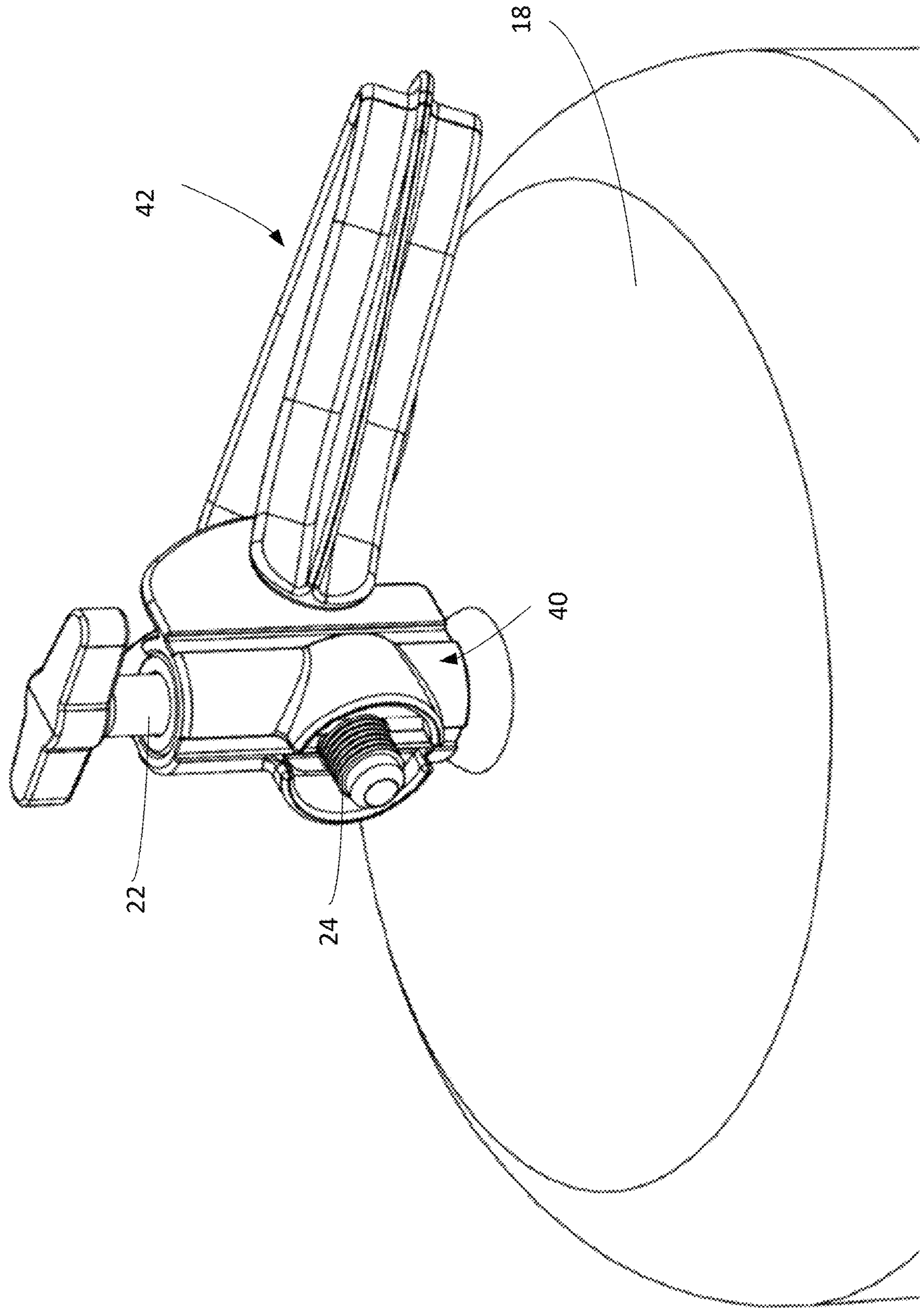
FIG. 23 is a partial perspective view of the portable cylinder with the handle in a second position.

Turning now to FIG. 23, the handle 42 is rotatable relative to the handle support 42 to allow a user to move the handle during use providing more space to operate the shutoff valve 22 and the tilt nozzle 28. When the user grasps the handle 42, for example at the grip area 68, and rotates the handle, the first, second, third, and fourth spacers 76, 78, 80, and 82 rotate within the slots 122, 124, 126, and 128 and the first and third projections 70 and 74 rotate within the cavities 140 and 142.

It will be appreciated that the tilt nozzle 28 may be attached to the outlet 24 via the threaded connection at any suitable time. For example, the tilt nozzle 28 may be attached to the outlet 24 after the handle support 40 has been coupled to the shutoff valve 22 or after the handle 42 has been coupled to the handle support 40. The tilt nozzle 28 prevents removal of the handle support 40 from the shutoff valve 22.

The aforementioned systems, components, (e.g., tank, handle, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A portable cylinder for filling a balloon, the portable cylinder comprising:

a tank having a valve port;

a valve coupled to the valve port, the valve including a handle and an outlet port;

a nozzle coupled to the outlet port, the nozzle configured to receive the balloon; and a handle assembly including a handle support coupled to the valve and a handle coupled to the handle support, the handle support including a body having first and second ends circumferentially spaced from one another to define a gap and a longitudinal passage opening to a top and bottom of the body for receiving the valve, and first and second deflectable arms projecting from the body.

2. The portable cylinder according to claim 1, wherein the first and second deflectable arms are laterally spaced from one another on opposite sides of the gap.

3. The portable cylinder according to claim 1, wherein the body additionally includes an opening that opens to the longitudinal passage through which the outlet port of the valve extends.

4. The portable cylinder according to claim 1, wherein the first and second deflectable arms each include an inner arm member and an outer arm member laterally spaced from one another.

5. The portable cylinder according to claim 4, wherein each inner and outer arm member includes a slot opening to a bottom of the handle support.

6. The portable cylinder according to claim 5, wherein the handle includes a grip area for a user to grasp and an attachment member coupled to the first and second deflectable arms of the handle support.

7. The portable cylinder according to claim 6, wherein the attachment member includes a plurality of laterally spaced projections projecting radially outwardly from the attachment member and a spacer on each side of each of the plurality of projections.

8. The portable cylinder according to claim 7, wherein each spacer is configured to be received in one of the slots via a snap connection to couple the attachment member to the handle support.

9. The portable cylinder according to claim 8, wherein each pair of inner and outer arm members defines a cavity therebetween for receiving one of the plurality of laterally spaced projections.

10. The portable cylinder according to claim 9, wherein one of the plurality of laterally spaced projections is received between the inner arm members.

11. The portable cylinder according to claim 1, wherein the handle and handle support are polymeric.

12. A portable cylinder for filling a balloon, the portable cylinder comprising:

a tank having a valve port;

a valve coupled to the valve port, the valve including a handle and an outlet port;

a nozzle coupled to the outlet port, the nozzle configured to receive the balloon; and a handle assembly including:

a handle support coupled to the valve, the handle support including a body having first and second ends circumferentially spaced from one another to define a gap, and first and second deflectable arms projecting from the body, and a handle rotatably coupled to the handle support, the handle including an attachment member coupled to the first and second deflectable arms of the handle support.

13. The portable cylinder according to claim 12, wherein the first and second deflectable arms are laterally spaced from one another on opposite sides of the gap.

14. The portable cylinder according to claim 12, wherein the body additionally includes an opening that opens to the longitudinal passage through which the outlet port of the valve extends.

15. The portable cylinder according to claim 12, wherein the first and second deflectable arms each include an inner arm member and an outer arm member laterally spaced from one another.

16. The portable cylinder according to claim 15, wherein each inner and outer arm member includes a slot opening to a bottom of the handle support.

17. The portable cylinder according to claim 12, wherein the attachment member includes a plurality of laterally spaced projections projecting radially outwardly from the attachment member and a spacer on each side of each of the plurality of projections.

18. The portable cylinder according to claim 17, wherein each spacer is configured to be received in one of the slots via a snap connection to couple the attachment member to the handle.

19. A portable cylinder for filling a balloon, the portable cylinder comprising:

a tank having a valve port;

a valve coupled to the valve port, the valve including a handle and an outlet port;

a nozzle coupled to the outlet port, the nozzle configured to receive the balloon; and a handle assembly including a handle support coupled to the valve and a handle coupled to the handle support, the handle support including a body and first and second deflectable arms projecting from the body, each of the first and second deflectable arms including an inner arm member and an outer arm member laterally spaced from one another.

* * * * *